Figure 1:
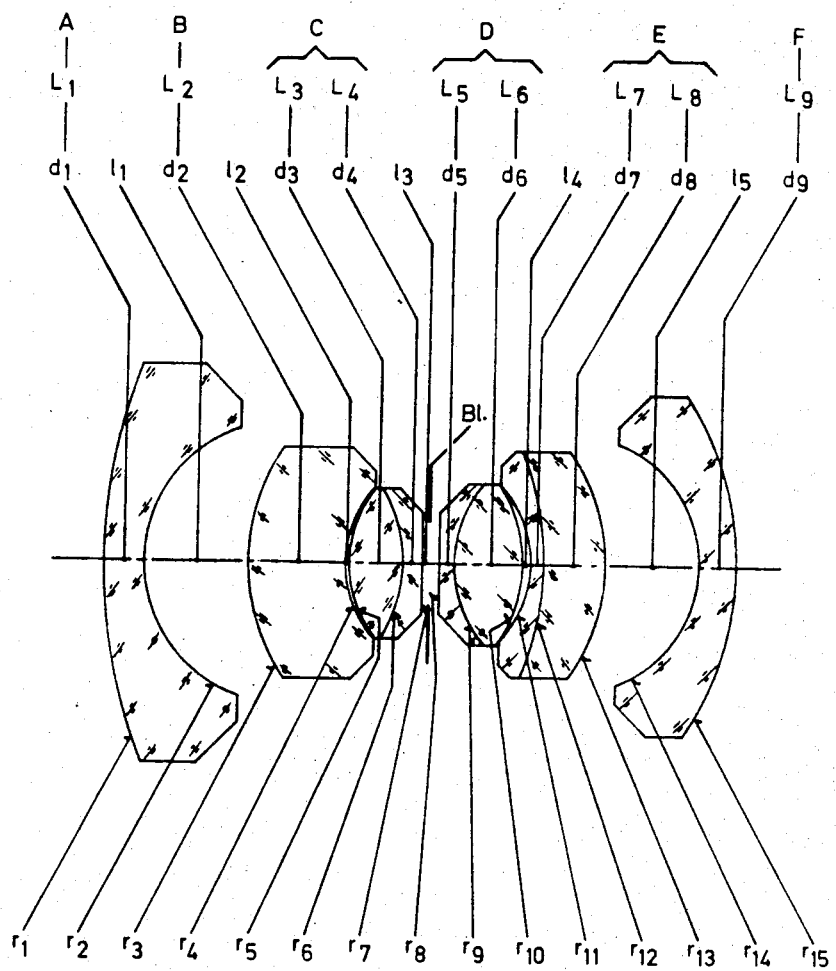
Figure 2:
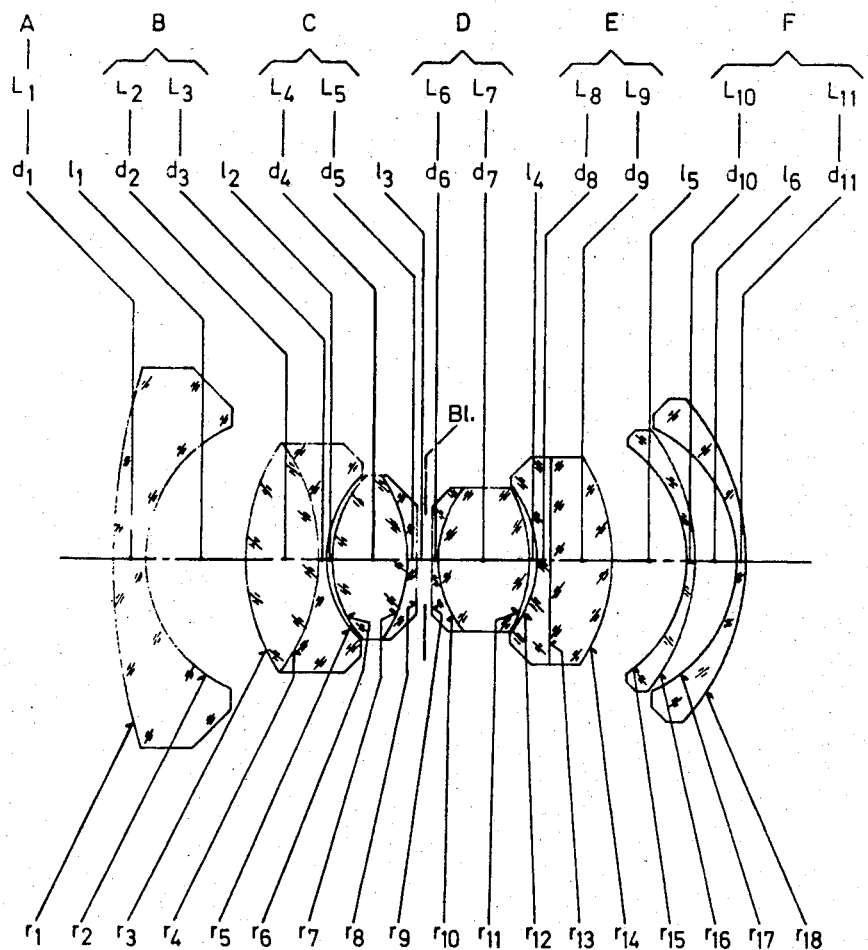
Figure 3:
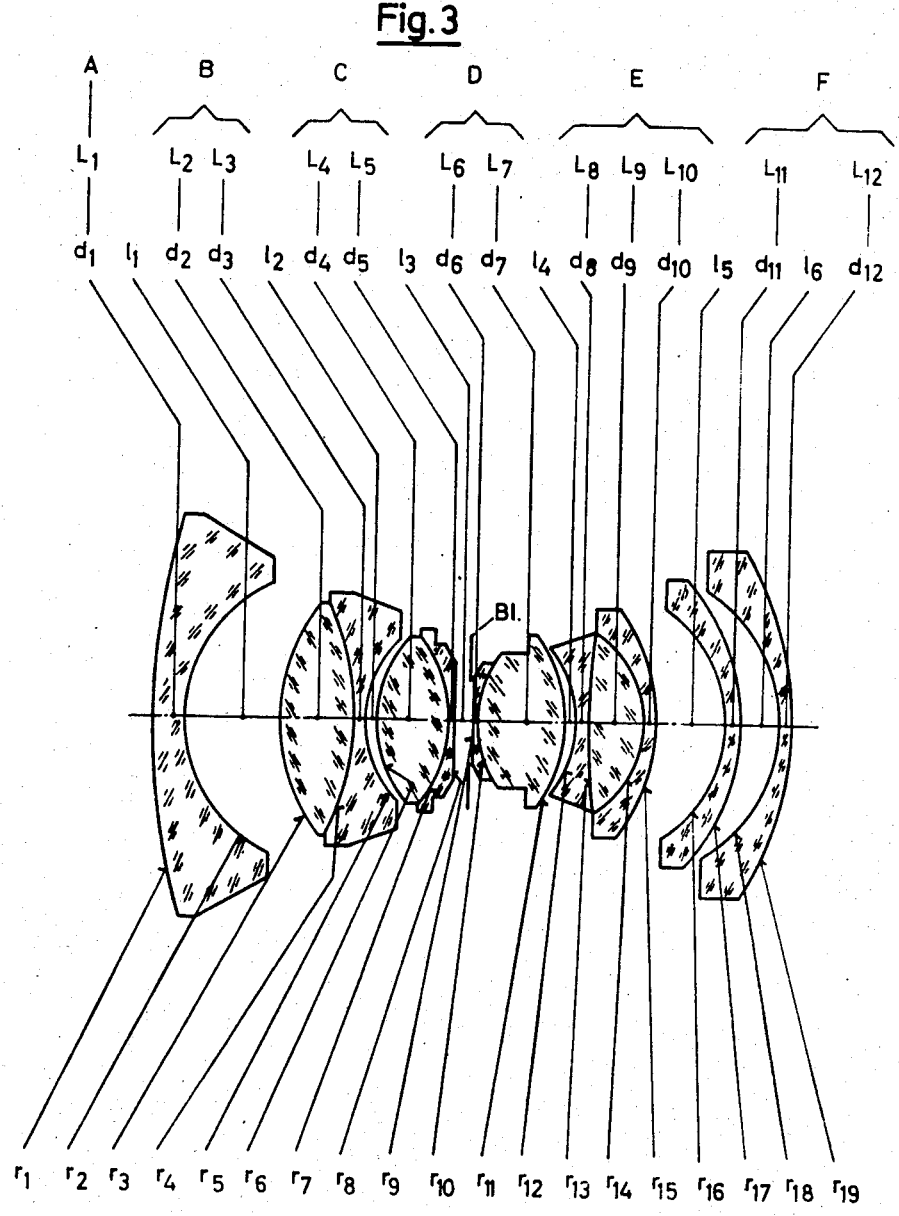
Figure 4:
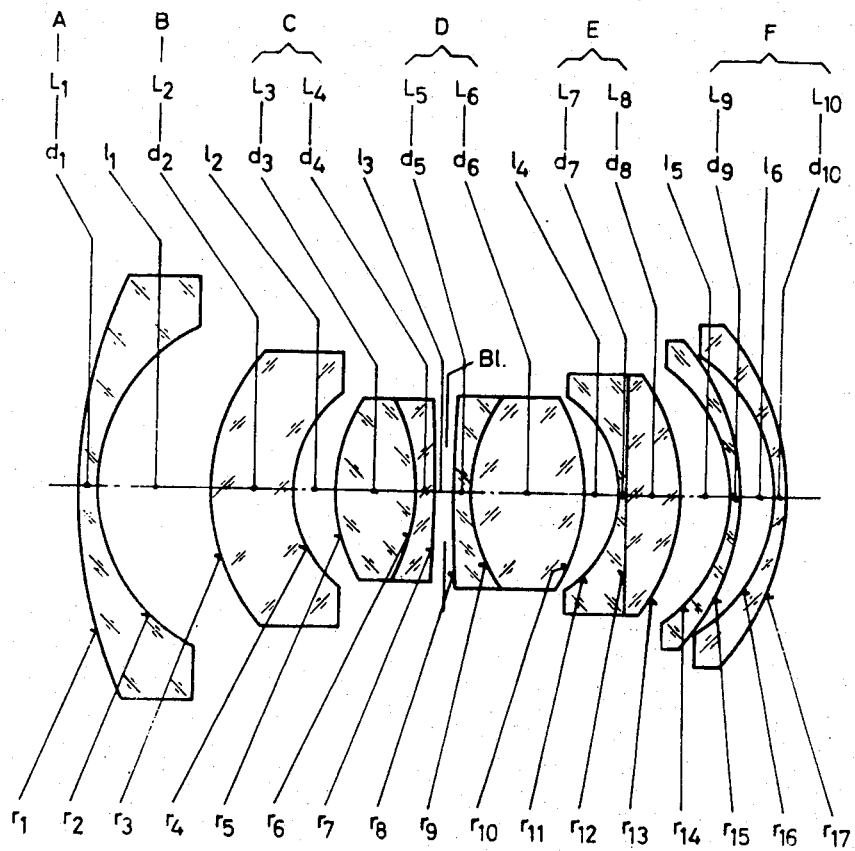
Figure 5:
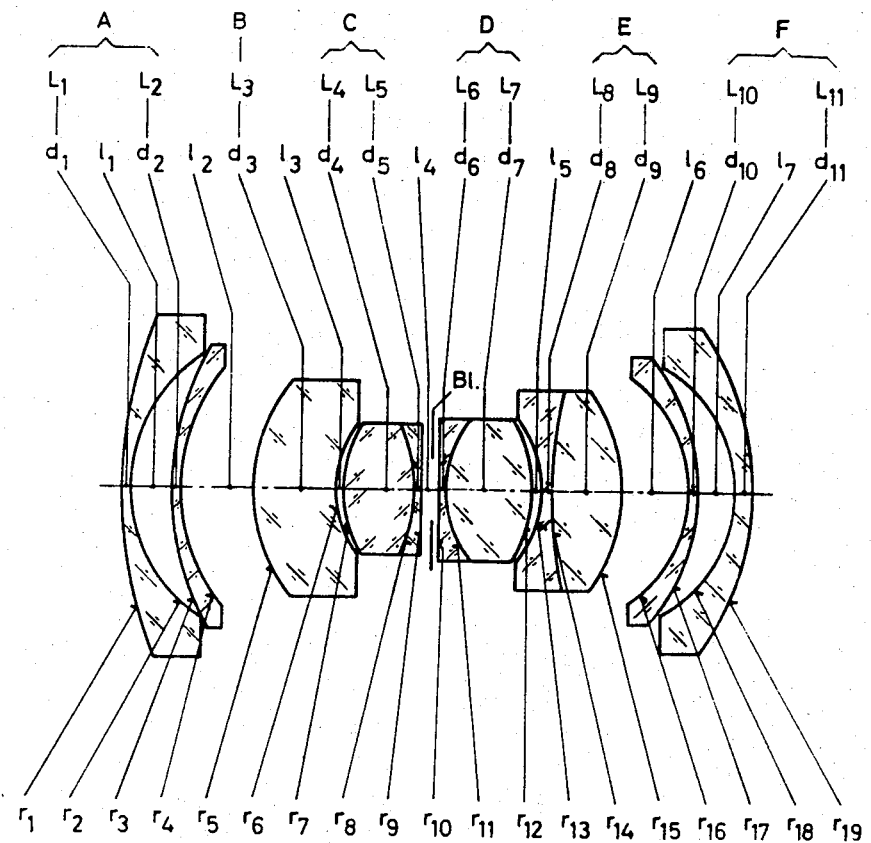
Figure 6:
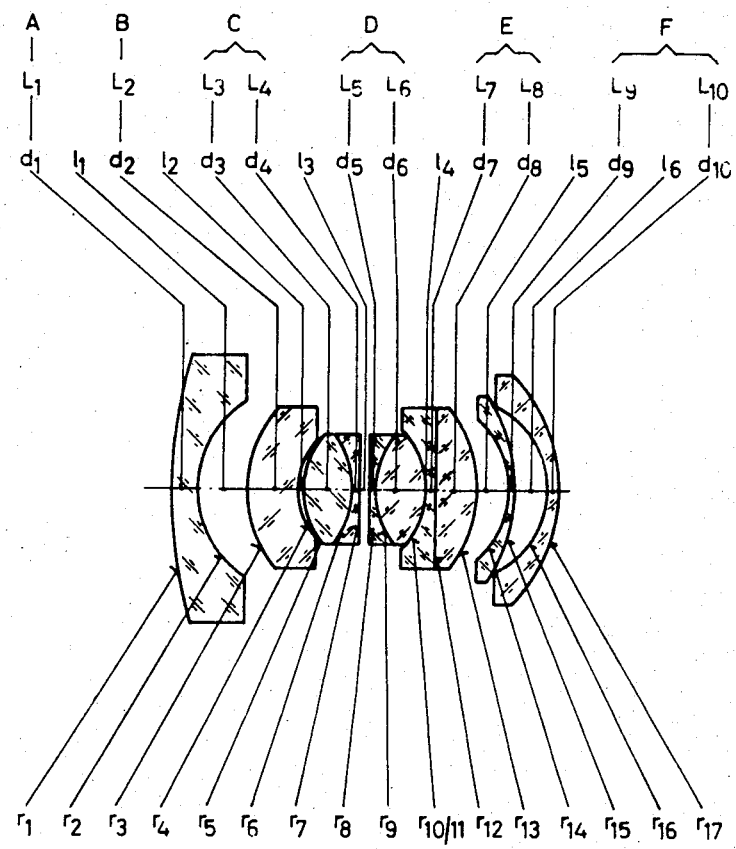
Figure 7:
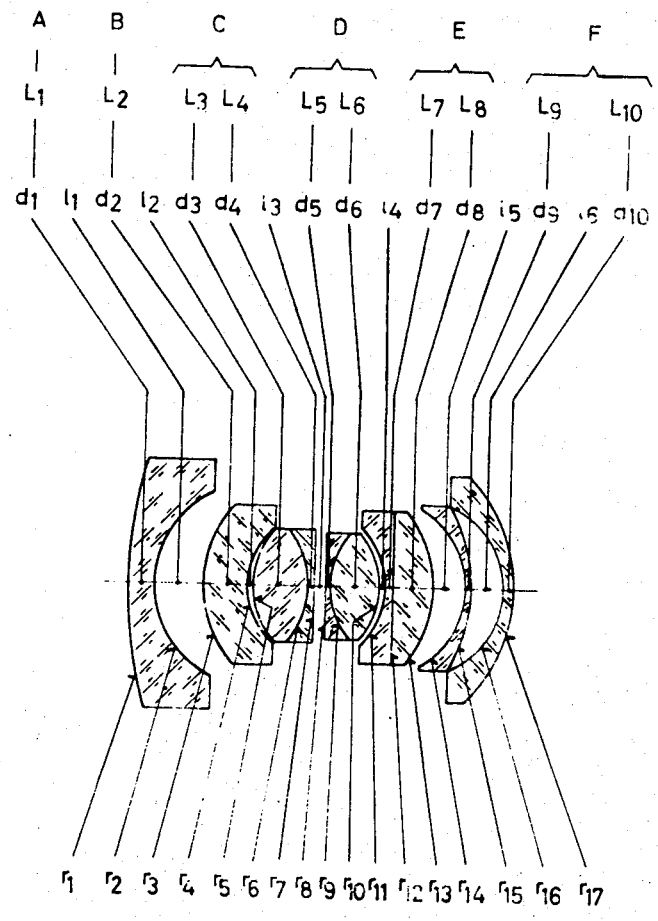
Figure 8:
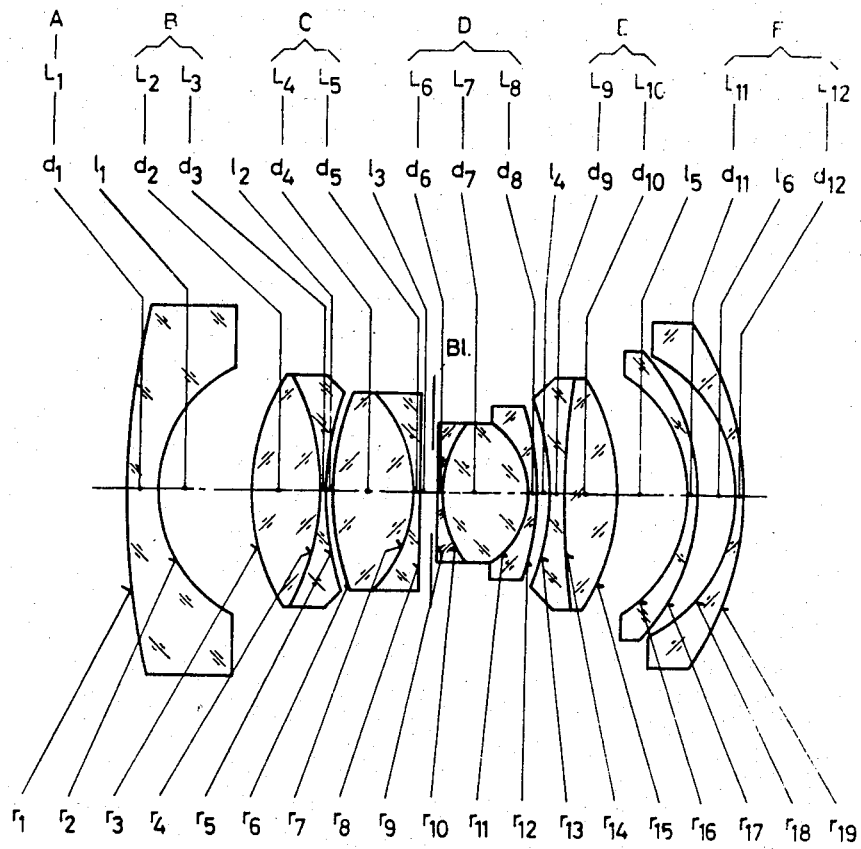

United States Patent
Bertele

[15] 3,700,312
[45] Oct. 24, 1972

[54] WIDE-ANGLE OBJECTIVE

[72] Inventor: Ludwig Bertele, Heerbrugg, Switzerland

[73] Assignee: Firma Wild Heerbrugg AG, Heerbrugg, Switzerland

[22] Filed: Oct. 14, 1971

[21] Appl. No.: 189,263

Related U.S. Application Data

[63] Continuation-in-part of Ser. No. 816,218, April 15, 1969.

[52] U.S. Cl.................................350/215, 350/214
[51] Int. Cl................................................G02b 9/62
[58] Field of Search............................350/214, 215

[56] References Cited

UNITED STATES PATENTS 3,630,600    12/1971    Bertele.......................350/215

*Primary Examiner*—David Schonberg
*Assistant Examiner*—Paul A. Sacher
*Attorney*—Werner W. Kleeman

[57] ABSTRACT

A wide-angle objective composed of six components separated from each other by air spaces and located three at the object side of the diaphragm and three at the image side of such diaphragm, said six lens components taken in consecutive order from the side of the object comprising: a first lens component composed of one or more dispersing meniscus lens members curved towards the object side; a second lens component which follows a larger air space composed of a meniscus lens component curved towards the object side; a third lens component which follows an air space and possessing a collecting refractive index and having a strongly convex curved outer surface facing the object side and further having a concave cemented surface facing the object side which at the side of the object possesses a greater refractive index than at the image side; a fourth lens component which follows the diaphragm space, said fourth lens component having a collecting refractive index and a strongly convex curved outer surface which faces the image and further possesses a concave cemented surface facing the image and which at the side of the image exhibits a greater refractive index than at the side of the object; a fifth lens component which follows an air space and comprising a meniscus lens component which is curved towards the image and assembled from at least one dispersing and collecting lens and; a sixth lens component which follows a larger air space and composed of one or more dispersing meniscus lens members curved towards the image.

5 Claims, 9 Drawing Figures

Patented Oct. 24, 1972

3,700,312

9 Sheets-Sheet 5

WIDE-ANGLE OBJECTIVE

CROSS-REFERENCE TO RELATED CASE

The present application is a continuation-in-part application of my commonly assigned, copending U.S. application, Ser. No. 816,218, filed Apr. 15, 1969, and entitled "Wide-Angle Objective."

BACKGROUND AND DISCLOSURE OF THE INVENTION

The present invention relates to an improved wide-angle objective composed of six components separated from each other by air spaces and located three at the object side of the diaphragm and three at the image side of such diaphragm.

According to the teachings of this invention the individual lens components are constructed and arranged in the following manner:

a. the first lens component A is one or a number of dispersing meniscus lens members curved towards the object side;

b. the second lens component B which follows a larger air space is also a meniscus lens component which is curved towards the object side;

c. the third lens component C follows an air space which is greater than 0.005 F and smaller than 0.17 F, this third lens component possessing a collecting refractive index and having a strongly convex curved outer or extreme surface facing the object side having a radius of curvature lying in a range between 0.26 and 0.95 F, and further has a concave or hollow cemented surface facing the object which at the side of the object possesses a clearly greater refractive index than at the image side and has a radius of curvature lying in a range between 0.30 and 0.72 F;

d. the fourth lens component D follows the diaphragm space, this fourth lens component having a collecting refractive index and a strongly convex curved outer or extreme surface which faces the image and possessing a radius of curvature between 0.24 and 1.05 F and further possesses a concave or hollow cemented surface facing the image and which at the side of the image exhibits a clearly greater refractive index than at the side of the object and has a radius of curvature which is in the range between 0.28 and 0.60 F;

e. the fifth lens component E follows an air space which is greater than 0.00 F and smaller than 0.25 F, this fifth lens component defining meniscus lens component which is curved towards the image and is assembled from at least one dispersing and collecting lens;

f. the sixth lens component F follows a larger air space and defines one or a number of dispersing meniscus lens members which are curved towards the image;

g. the spacing of both outer or extreme surfaces of the cemented collecting lens components C and D which face away from the diaphragm is in a range between 0.35 F and 0.90 F;

h. the radius of curvature of the convex surface of the third lens component C is in a range amounting to one to three times the axial thickness of this third lens component;

i. the radius of curvature of the convex surface of the fourth lens component D is in a range between one to three times the axial thickness of such fourth lens component; and j. the outside radius of the objective at the side of the image is less than the outside radius at the side of the object.

Objectives with these features constitute an improvement upon the objective illustrated in FIG. 1 of my aforementioned U.S. Pat. No. 2,734,424, granted Feb. 14, 1956. Such lens sequence which has proven itself in practice nonetheless possesses certain drawbacks, especially with regard to correction of the spherical and spherochromatic aberration. It has been found that air spaces or layers in the form of a meniscus concave towards the diaphragm instead of cemented surfaces concave towards the diaphragm quite considerably improve the course of the curves for the aforementioned aberrations without having to take into account any other drawbacks. These measures are advantageous throughout widely extending boundries.

Additional experiments have shown that the comatic correction for the different image angles can be carried out much better if there is dispensed with the extensive symmetry contemplated by the examples of the aforementioned U.S. Pat. No. 2,734,424, and specifically, especially with regard to the curvature of the boundry surfaces of the small air space between the collecting lens components enclosing both sides of the diaphragm and the neighboring meniscus-shaped lens components. The deviation from the symmetrical arrangement is manifested in that the difference of the radii of curvature of the surfaces bounding these aforementioned air spaces to both sides of the diaphragm is greater than 1.35 times the corresponding difference at the object side of the diaphragm.

The invention is illustrated by fourteen examples shown in FIGS. 1 through 9 of the accompanying drawings, each relating to an objective having a focal length F equal to 100 mm, an image angle of 90°, and an aperture ratio of about 1:4 in Examples 1 to 7 and 12, and 1:5.6 in Examples 8 to 11 and 13, 14. In each Figure the six successive components starting from the object side are designated by the reference characters A, B, C, D, E, and F. The reference character L in conjunction with a number is used to denote the individual lenses. Furthermore, in the Examples given hereinafter, the symbols $r$ represent the radii of curvature, the symbols $d$ represent the thickness of the lenses, and the symbols $l$ the air spaces. The symbol $n_d$ represents the refractive index for the helium line, and the symbol $v_d$ represents the Abbe number. The numbering is consecutive from the side of the object, and reference character B1 denotes the diaphragm.

Considering now the drawings, each of the wide-angle objectives will be seen to be composed of six components A, B, C, D, E and F separated from each other by air spaces. Three of the lens components, namely components A, B, C, are located at the object side of the diaphragm B1 and the other three lens components, D, E and F are disposed at the image side of such diaphragm. The first lens component A reckoned from the side of the object may be one or a number of dispersing meniscus lens members curved towards the side of the object. Hence, such first lens component A may consist of a single dispersing meniscus lens member $L_1$ as in FIGS. 1 to 4 and 6 to 9 inclusive, or two dispersing meniscus lens members $L_1$ and $L_2$ as in the arrangement of FIG. 5.

After a larger air space $l_1$ (FIGS. 1-4 and 6-9) or $l_2$ (FIG. 5) there follows the second lens component B which is also a dispersing meniscus lens component curved towards the object side. In the embodiments depicted in FIGS. 1, 4, 5, 6, 7 and 9 such second lens component B consists of a single dispersing lens member $L_2$, whereas in the embodiment of FIGS. 2, 3 and 8 such consists of the cemented lens members $L_2$ and $L_3$.

The third lens component C follows an air space $l_2$ (FIGS. 1-4 and 6-9) or $l_3$ (FIG. 5) which is greater than 0.00 F and smaller than 0.17 F. This third lens component C comprises the lens members $L_3$, $L_4$ (FIGS. 1, 4, 6, 7 and 9) or lens members $L_4$, $L_5$ (FIGS. 2, 3, 5 and 8) and possesses a collecting refractive index. Moreover, lens component C has a strongly convex curved outer or extreme surface facing the object side having a radius of curvature which is in a range between 0.26 and 0.95 F. Further, this third lens component C possesses a cemented surface which is concave or hollow towards the object side and which at the side of the object possesses a clearly greater refractive index than at the image side and has a radius of curvature lying in a range between 0.30 and 0.72 F.

Figure 9:
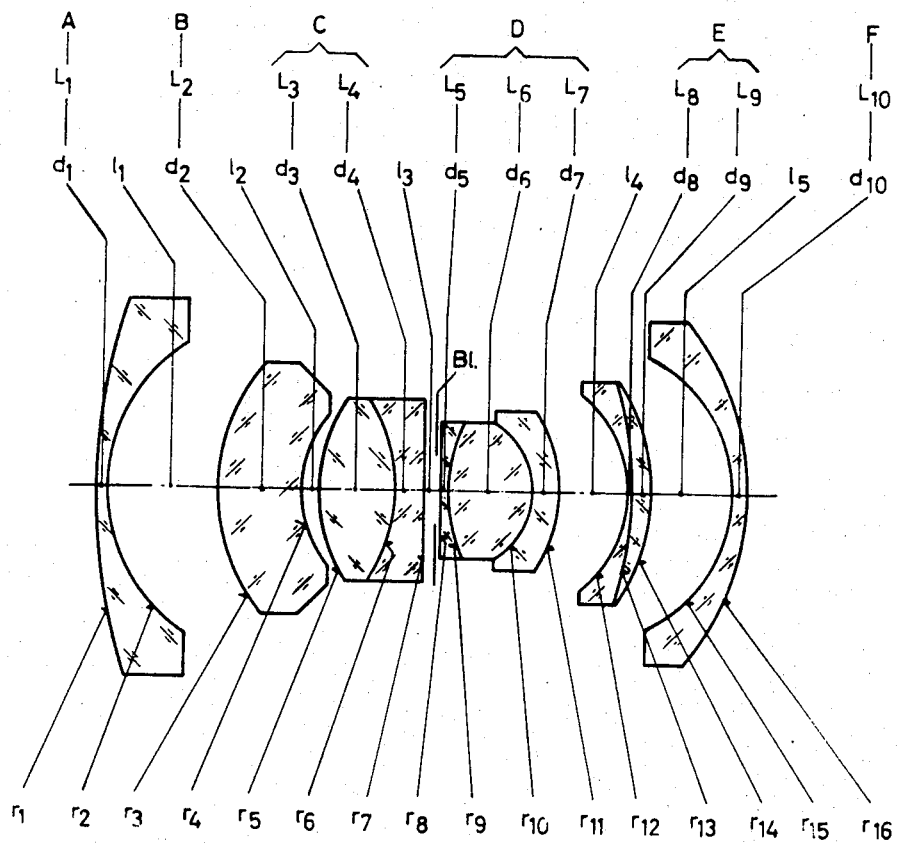

The fourth lens component D follows the diaphragm region or space and comprises the cemented lens member $L_5$, $L_6$ (FIGS. 1, 4, 6 and 7) or the lens members $L_6$, $L_7$ (FIGS. 2, 3 and 5) or the lens members $L_6$, $L_7$ and $L_8$ (FIG. 8) or the lens members $L_5$, $L_6$ and $L_7$ (FIG. 9). This fourth lens component D possesses a collecting refractive index and has a strongly convex curved outer or extreme surface which faces the image and possesses a radius of curvature lying in a range between 0.24 F and 1.05 F and further possesses a cemented surface which is concave or hollow in the direction facing the image and which at the side of the image exhibits a clearly greater refractive index than at the side of the object and has a radius of curvature which is in a range between 0.28 and 0.60 F.

The fifth lens component E follows an air space $l_4$ (FIGS. 1-4 and 6-9) or $l_5$ (FIG. 5) which is greater than 0.00 F and smaller than 0.25 F. This fifth lens component defines a meniscus lens component which is curved towards the image and is assembled from at least one dispersing and collecting lens component. In FIGS. 1, 4, 6, and 7 lens component E consists of the cemented lens elements $L_7$ and $L_8$, in FIGS. 2, 5 and 9 of the cemented lens elements $L_8$ and $L_9$, in FIG. 3 of the cemented lens elements $L_8$, $L_9$ and $L_{10}$, and in FIG. 8 of the cemented lens elements $L_9$ and $L_{10}$.

The sixth lens component F follows a larger air space $l_5$ (FIGS. 1-4 and 6-9) and $L_6$ (FIG. 6) and defines one or a number of dispersing meniscus lens members which are curved towards the image. In FIG. 1 lens component F consists of lens member $L_9$, in FIGS. 2 and 5 the lens members $L_{10}$ and $L_{11}$, in FIGS. 4, 6 and 7 the lens members $L_9$ and $L_{10}$, in FIGS. 3 and 8 the lens members $L_{11}$ and $L_{12}$ and in FIG. 9 the lens member $L_{10}$.

The spacing of both outer or extreme surfaces of the cemented collecting lens components C and D which face away from the diaphragm is in a range between 0.35 and 0.90 F. The radius of curvature of the convex surface of the third lens component C is in a range amounting to one to three times the axial thickness of such third lens component. The radius of curvature of the convex surface of the fourth lens component D is in a range between one to three times the axial thickness of such fourth lens component. Further, the outside radius of the objective at the side of the image is less than the outside radius at the side of the object.

With respect to the correction possibilities, above all for the large image angle, favorable conditions prevail if the lens component F is composed of two meniscus lenses separated by an air space. Notwithstanding the small diameter of the diaphragm or aperture bundle, such a division is more advantageous at this location of the objective than at the lens component A. The number of independent or freestanding dispersing meniscus lens members is therefore greater by a factor of one at the side of the image than at the side of the object.

While taking into consideration the position of the infrared image, it is advantageous to form the dispersing meniscus-shaped system portion or component of the image side inner lens component of at least three lens elements of suitable glass selection as shown in Example 3 - 6.

It is within the framework of the invention to also divide the lens component A, as taught in Example 8. Cemented surfaces can also remain uncemented and separated from one another by small air spaces, insofar as there does not occur any total reflection of the bundle of light rays participating in the formation of the image. In the event that in one or the other lens component there is introduced an air layer or space which does not appreciably influence the total efficiency of the objective, then, in this manner, divided lens components, within the teachings of the invention, are to be considered as a single component.

The optical data of the various objectives depicted in FIGS. 1 to 9 are given in the following tables, in which each Example indicates adjacent thereto the number of the corresponding Figure illustrating it.

EXAMPLE 1 (FIG. 1)

| | | | $n_d$ | $v_d$ |
|---|---|---|---|---|
| $L_1$ | $r_1 = + 185.00$ | $d_1 = 15.00$ | 1.55232 | 63.5 |
| | $r_2 = + 49.00$ | $l_1 = 36.30$ | | |
| $L_2$ | $r_3 = + 71.00$ | $d_2 = 35.00$ | 1.74400 | 44.8 |
| | $r_4 = + 39.25$ | $l_2 = 1.20$ | | |
| $L_3$ | $r_5 = + 40.95$ | $d_3 = 19.00$ | 1.67790 | 55.2 |
| $L_4$ | $r_6 = - 48.30$ | $d_4 = 7.10$ | 1.57500 | 41.5 |
| | $r_7 = +5000.00$ | $l_3 = 6.24$ | | |
| $L_5$ | $r_8 = \infty$ | $d_5 = 6.00$ | 1.51680 | 64.2 |
| $L_6$ | $r_9 = + 42.00$ | $d_6 = 24.00$ | 1.65830 | 57.3 |
| | $r_{10} = - 49.50$ | $l_4 = 2.00$ | | |
| $L_7$ | $r_{11} = - 39.15$ | $d_7 = 5.00$ | 1.71736 | 29.5 |
| | $r_{12} = -100.00$ | | | |
| $L_8$ | $r_{13} = - 65.91$ | $d_8 = 22.00$ | 1.71300 | 53.8 |
| | $r_{14} = - 45.30$ | $l_5 = 33.00$ | | |
| $L_9$ | $r_{15} = -105.06$ | $d_9 = 12.00$ | 1.71300 | 53.8 |

Distance $r_{15}$– Image = 31.6

EXAMPLE 2 (FIG. 2)

|  |  |  | $n_d$ | $v_d$ |
|---|---|---|---|---|
| $L_1$ | $r_1=+\ 227.50$ |  |  |  |
|  | $r_2=+\ 50.20$ | $d_1=12.00$ | 1.55232 | 63.5 |
|  |  | $l_1=34.90$ |  |  |
|  | $r_3=+\ 72.00$ |  |  |  |
| $L_2$ |  | $d_2=25.00$ | 1.74400 | 44.8 |
|  | $r_4=-\ 68.00$ |  |  |  |
| $L_3$ |  | $d_3=4.00$ | 1.73000 | 40.4 |
|  | $r_5=+\ 39.60$ |  |  |  |
|  |  | $l_2=1.60$ |  |  |
|  | $r_6=+\ 42.30$ |  |  |  |
| $L_4$ |  | $d_4=26.00$ | 1.67850 | 50.3 |
|  | $r_7=-\ 49.40$ |  |  |  |
| $L_5$ |  | $d_5=3.30$ | 1.58000 | 46.3 |
|  | $r_8=-1300.00$ |  |  |  |
|  |  | $l_3=5.80$ |  |  |
|  | $r_9=-610.50$ |  |  |  |
| $L_6$ |  | $d_6=2.00$ | 1.51700 | 64.2 |
|  | $r_{10}=+\ 39.90$ |  |  |  |
| $L_7$ |  | $d_7=32.40$ | 1.64000 | 59.6 |
|  | $r_{11}=-\ 50.00$ |  |  |  |
|  |  | $l_4=2.50$ |  |  |
|  | $r_{12}=-\ 39.30$ |  |  |  |
| $L_8$ |  | $d_8=5.00$ | 1.65000 | 33.7 |
|  | $r_{13}=\infty$ |  |  |  |
| $L_9$ |  | $d_9=21.80$ | 1.65000 | 54.9 |
|  | $r_{14}=-\ 67.04$ |  |  |  |
|  |  | $l_5=25.90$ |  |  |
|  | $r_{15}=-\ 49.00$ |  |  |  |
| $L_{10}$ |  | $d_{10}=3.00$ | 1.55232 | 63.5 |
|  | $r_{16}=-\ 74.00$ |  |  |  |
|  |  | $l_6=15.00$ |  |  |
|  | $r_{17}=-\ 51.00$ |  |  |  |
| $L_{11}$ |  | $d_{11}=3.70$ | 1.51100 | 60.5 |
|  | $r_{18}=-\ 85.08$ |  |  |  |

Distance $r_{18}$– Image = 28.6

EXAMPLE 3 (FIG. 3)

|  |  |  | $n_d$ | $v_d$ |
|---|---|---|---|---|
| $L_1$ | $r_1=+\ 251.35$ |  |  |  |
|  | $r_2=+\ 49.93$ | $d_1=11.15$ | 1.51680 | 64.2 |
|  |  | $l_1=33.46$ |  |  |
|  | $r_3=+\ 63.88$ |  |  |  |
| $L_2$ |  | $d_2=25.59$ | 1.74400 | 44.8 |
|  | $r_4=-\ 93.10$ |  |  |  |
| $L_3$ |  | $d_3=5.55$ | 1.74600 | 40.3 |
|  | $r_5=+\ 39.35$ |  |  |  |
|  |  | $l_2=1.49$ |  |  |
|  | $r_6=+\ 45.01$ |  |  |  |
| $L_4$ |  | $d_4=24.00$ | 1.65830 | 57.3 |
|  | $r_7=-\ 44.78$ |  |  |  |
| $L_5$ |  | $d_5=2.03$ | 1.57453 | 52.2 |
|  | $r_8=-1266.92$ |  |  |  |
|  |  | $l_3=6.13$ |  |  |
|  | $r_9=-4013.98$ |  |  |  |
| $L_6$ |  | $d_6=1.97$ | 1.52122 | 62.8 |
|  | $r_{10}=+\ 42.65$ |  |  |  |
| $L_7$ |  | $d_7=33.07$ | 1.63854 | 55.4 |
|  | $r_{11}=-\ 49.86$ |  |  |  |
|  |  | $l_4=3.02$ |  |  |
|  | $r_{12}=-\ 41.82$ |  |  |  |
| $L_8$ |  | $d_8=3.67$ | 1.65332 | 39.7 |
|  | $r_{13}=+\ 262.44$ |  |  |  |
| $L_9$ |  | $d_9=20.21$ | 1.65160 | 58.5 |
|  | $r_{14}=-\ 36.87$ |  |  |  |
| $L_{10}$ |  | $d_{10}=3.67$ | 1.65332 | 39.7 |
|  | $r_{15}=-\ 66.09$ |  |  |  |
|  |  | $l_5=24.83$ |  |  |
|  | $r_{16}=-\ 48.52$ |  |  |  |
| $L_{11}$ |  | $d_{11}=4.26$ | 1.51680 | 64.2 |
|  | $r_{17}=-\ 74.50$ |  |  |  |
|  |  | $l_6=12.79$ |  |  |
|  | $r_{18}=-\ 54.72$ |  |  |  |
| $L_{12}$ |  | $d_{12}=4.66$ | 1.51680 | 64.2 |
|  | $r_{19}=-116.93$ |  |  |  |

Distance $r_{19}$– Image = 26.3

EXAMPLE 4 (FIG. 3)

|  |  |  | $n_d$ | $v_d$ |
|---|---|---|---|---|
| $L_1$ | $r_1=+\ 229.39$ |  |  |  |
|  | $r_2=+\ 49.17$ | $d_1=10.98$ | 1.51680 | 64.2 |
|  |  | $l_1=32.95$ |  |  |
|  | $r_3=+\ 66.75$ |  |  |  |
| $L_2$ |  | $d_2=25.20$ | 1.74400 | 44.8 |
|  | $r_4=-\ 82.90$ |  |  |  |
| $L_3$ |  | $d_3=1.39$ | 1.74600 | 40.3 |
|  | $r_5=+\ 39.27$ |  |  |  |
|  |  | $l_2=1.70$ |  |  |
|  | $r_6=+\ 41.80$ |  |  |  |
| $L_4$ |  | $d_4=28.43$ | 1.65830 | 57.3 |
|  | $r_7=-\ 48.98$ |  |  |  |
| $L_5$ |  | $d_5=2.00$ | 1.54109 | 55.4 |
|  | $r_8=\infty$ |  |  |  |
|  |  | $l_3=6.04$ |  |  |
|  | $r_9=-2025.85$ |  |  |  |
| $L_6$ |  | $d_6=1.94$ | 1.52122 | 62.8 |
|  | $r_{10}=+\ 38.45$ |  |  |  |
| $L_7$ |  | $d_7=32.57$ | 1.63854 | 55.4 |
|  | $r_{11}=-\ 50.72$ |  |  |  |
|  |  | $l_4=2.26$ |  |  |
|  | $r_{12}=-\ 38.57$ |  |  |  |
| $L_8$ |  | $d_8=3.55$ | 1.65332 | 39.7 |
|  | $r_{13}=+\ 258.47$ |  |  |  |
| $L_9$ |  | $d_9=19.90$ | 1.65160 | 58.5 |
|  | $r_{14}=-\ 36.31$ |  |  |  |
| $L_{10}$ |  | $d_{10}=3.62$ | 1.65332 | 39.7 |
|  | $r_{15}=-\ 61.55$ |  |  |  |
|  |  | $l_5=24.46$ |  |  |
|  | $r_{16}=-\ 47.78$ |  |  |  |
| $L_{11}$ |  | $d_{11}=4.20$ | 1.51680 | 64.2 |
|  | $r_{17}=-\ 73.37$ |  |  |  |
|  |  | $l_6=12.60$ |  |  |
|  | $r_{18}=-\ 53.97$ |  |  |  |
| $L_{12}$ |  | $d_{12}=3.36$ | 1.51680 | 64.2 |
|  | $r_{19}=-108.41$ |  |  |  |

Distance $r_{19}$– Image = 29.0

EXAMPLE 5 (FIG. 3)

|  |  |  | $n_d$ | $v_d$ |
|---|---|---|---|---|
| $L_1$ | $r_1=+\ 242.39$ |  |  |  |
|  | $r_2=+\ 49.26$ | $d_1=11.00$ | 1.51680 | 64.2 |
|  |  | $l_1=33.01$ |  |  |
|  | $r_3=-\ 64.72$ |  |  |  |
| $L_2$ |  | $d_2=25.24$ | 1.74400 | 44.8 |
|  | $r_4=-\ 83.04$ |  |  |  |
| $L_3$ |  | $d_3=1.39$ | 1.74600 | 40.3 |
|  | $r_5=+\ 39.33$ |  |  |  |
|  |  | $l_2=1.62$ |  |  |
|  | $r_6=+\ 41.71$ |  |  |  |
| $L_4$ |  | $d_4=28.48$ | 1.65830 | 57.3 |
|  | $r_7=-\ 50.10$ |  |  |  |
| $L_5$ |  | $d_5=2.01$ | 1.54109 | 52.6 |
|  | $r_8=\infty$ |  |  |  |
|  |  | $l_3=6.05$ |  |  |
|  | $r_9=-1990.27$ |  |  |  |
| $L_6$ |  | $d_6=1.94$ | 1.52122 | 62.8 |
|  | $r_{10}=+\ 38.12$ |  |  |  |
| $L_7$ |  | $d_7=32.62$ | 1.63854 | 55.4 |
|  | $r_{11}=-\ 55.02$ |  |  |  |
|  |  | $l_4=2.72$ |  |  |
|  | $r_{12}=-\ 38.49$ |  |  |  |
| $L_8$ |  | $d_8=3.56$ | 1.65332 | 39.7 |
|  | $r_{13}=+\ 258.90$ |  |  |  |
| $L_9$ |  | $d_9=19.94$ | 1.65160 | 58.5 |
|  | $r_{14}=-\ 36.38$ |  |  |  |
| $L_{10}$ |  | $d_{10}=3.62$ | 1.65332 | 39.7 |
|  | $r_{15}=-\ 58.70$ |  |  |  |
|  |  | $l_5=24.50$ |  |  |
|  | $r_{16}=-\ 47.86$ |  |  |  |
| $L_{11}$ |  | $d_{11}=4.21$ | 1.51680 | 64.2 |
|  | $r_{17}=-\ 73.49$ |  |  |  |
|  |  | $l_6=12.62$ |  |  |
|  | $r_{18}=-\ 54.06$ |  |  |  |
| $L_{12}$ |  | $d_{12}=3.37$ | 1.51680 | 64.2 |
|  | $r_{19}=-103.17$ |  |  |  |

Distance $r_{19}$– Image = 27.5

EXAMPLE 6 (FIG. 3)

|  |  |  | $n_d$ | $v_d$ |
|---|---|---|---|---|
| $L_1$ | $r_1=+\ 255.09$ |  |  |  |
|  | $r_2=+\ 49.14$ | $d_1=10.98$ | 1.51680 | 64.2 |
|  |  | $l_1=32.94$ |  |  |
|  | $r_3=+\ 66.39$ |  |  |  |
| $L_2$ |  | $d_2=24.54$ | 1.74400 | 44.8 |
|  | $r_4=-\ 82.85$ |  |  |  |
| $L_3$ |  | $d_3=1.29$ | 1.74600 | 40.3 |
|  | $r_5=+\ 32.29$ |  |  |  |
|  |  | $l_2=0.03$ |  |  |
|  | $r_6=+\ 32.29$ |  |  |  |
| $L_4$ |  | $d_4=29.71$ | 1.65830 | 57.3 |
|  | $r_7=-\ 51.95$ |  |  |  |
| $L_5$ |  | $d_5=2.91$ | 1.54109 | 59.7 |
|  | $r_8=\infty$ |  |  |  |
|  |  | $l_3=6.03$ |  |  |
|  | $r_9=-3755.70$ |  |  |  |

| | | | | |
|---|---|---|---|---|
| $L_6$ | $r_{10}=+\ 38.42$ | $d_6=\ 1.94$ | 1.52122 | 62.8 |
| $L_7$ | $r_{11}=-\ 54.89$ | $d_7=31.00$ | 1.63854 | 55.4 |
| | $r_{12}=-\ 39.81$ | $l_4=\ 2.58$ | | |
| $L_8$ | $r_{13}=+258.31$ | $d_8=\ 3.87$ | 1.65332 | 39.7 |
| $L_9$ | $r_{14}=-\ 36.29$ | $d_9=20.86$ | 1.65160 | 58.5 |
| $L_{10}$ | $r_{15}=-\ 58.37$ | $d_{10}=3.87$ | 1.65332 | 39.7 |
| | $r_{16}=-\ 47.76$ | $l_5=24.54$ | | |
| $L_{11}$ | $r_{17}=-\ 73.33$ | $d_{11}=3.87$ | 1.51680 | 64.2 |
| | $r_{18}=-\ 53.79$ | $l_6=12.59$ | | |
| $L_{12}$ | $r_{19}=-110.29$ | $d_{12}=4.20$ | 1.51680 | 52.2 |
| Distance $r_{19}-$ Image = 27.5 | | | | |

EXAMPLE 7 (FIG. 3)

| | | | $n_d$ | $\nu_d$ |
|---|---|---|---|---|
| $L_1$ | $r_1=+\ 230.52$ | $d_1=11.04$ | 1.51680 | 64.2 |
| | $r_2=+\ 49.68$ | $l_1=33.12$ | | |
| $L_2$ | $r_3=+\ 63.23$ | $d_2=25.32$ | 1.74400 | 44.8 |
| $L_3$ | $r_4=-\ 92.14$ | $d_3=\ 5.49$ | 1.74600 | 40.3 |
| | $r_5=+\ 40.91$ | $l_2=\ 1.82$ | | |
| $L_4$ | $r_6=+\ 49.32$ | $d_4=23.75$ | 1.65830 | 57.3 |
| $L_5$ | $r_7=-\ 45.00$ | $d_5=\ 2.01$ | 1.57453 | 51.0 |
| | $r_8=-2012.97$ | $l_3=\ 6.06$ | | |
| $L_6$ | $r_9=\ \infty$ | $d_6=\ 1.95$ | 1.52122 | 62.8 |
| $L_7$ | $r_{10}=+\ 43.51$ | $d_7=32.73$ | 1.63854 | 55.4 |
| | $r_{11}=-\ 49.35$ | $l_4=\ 2.99$ | | |
| $L_8$ | $r_{12}=-\ 41.69$ | $d_8=\ 3.64$ | 1.65332 | 39.7 |
| $L_9$ | $r_{13}=+259.74$ | $d_9=20.00$ | 1.65160 | 58.5 |
| $L_{10}$ | $r_{14}=-\ 36.49$ | $d_{10}=3.64$ | 1.65332 | 39.7 |
| | $r_{15}=-\ 62.24$ | $l_5=24.58$ | | |
| $L_{11}$ | $r_{16}=-\ 48.02$ | $d_{11}=4.22$ | 1.51680 | 64.2 |
| | $r_{17}=-\ 73.73$ | $l_6=12.66$ | | |
| $L_{12}$ | $r_{18}=-\ 54.16$ | $d_{12}=4.61$ | 1.51680 | 64.2 |
| | $r_{19}=-121.30$ | | | |
| Distance $r_{19}-$ Image = 28.4 | | | | |

EXAMPLE 8 (FIG. 4)

| | | | $n_d$ | $\nu_d$ |
|---|---|---|---|---|
| $L_1$ | $r_1=+\ 173.00$ | $d_1=\ 7.0$ | 1.57957 | 53.7 |
| | $r_2=+\ 62.40$ | $l_1=40.0$ | | |
| $L_2$ | $r_3=+\ 72.64$ | $d_2=29.0$ | 1.75084 | 27.5 |
| | $r_4=+\ 43.00$ | $l_2=15.0$ | | |
| $L_3$ | $r_5=+\ 60.00$ | $d_3=30.0$ | 1.67790 | 55.2 |
| $L_4$ | $r_6=-\ 68.00$ | $d_4=\ 6.0$ | 1.58267 | 46.5 |
| | $r_7=-\ 561.40$ | $l_3=\ 6.0$ | | |
| $L_5$ | | $d_5=\ 6.0$ | 1.51680 | 64.2 |
| | $r_9=+\ 57.50$ | | | |
| $L_6$ | $r_{10}=-\ 65.00$ | $d_6=41.0$ | 1.64050 | 60.1 |
| | $r_{11}=-\ 40.90$ | $l_4=12.0$ | | |
| $L_7$ | $r_{12}=\ \infty$ | $d_7=\ 2.0$ | 1.64769 | 33.9 |
| $L_8$ | $r_{13}=-\ 70.28$ | $d_8=19.0$ | 1.65113 | 55.9 |
| | $r_{14}=-\ 55.00$ | $l_5=18.0$ | | |
| $L_9$ | $r_{15}=-\ 80.00$ | $d_9=\ 3.0$ | 1.55753 | 67.3 |
| | $r_{16}=-\ 57.00$ | $l_6=12.0$ | | |
| $L_{10}$ | $r_{17}=-\ 90.00$ | $d_{10}=4.0$ | 1.55753 | 67.3 |
| Distance $r_{17}-$ Image = 26.3 | | | | |

EXAMPLE 9 (FIG. 5)

| | | | $n_d$ | $\nu_d$ |
|---|---|---|---|---|
| $L_1$ | $r_1=+\ 157.00$ | $d_1=\ 3.0$ | 1.51895 | 57.4 |
| | $r_2=+\ 55.00$ | $l_1=14.0$ | | |
| $L_2$ | $r_3=+\ 101.00$ | $d_2=\ 3.0$ | 1.51895 | 57.4 |
| | $r_4=+\ 65.60$ | $l_2=26.0$ | | |
| $L_3$ | $r_5=+\ 60.33$ | $d_3=29.5$ | 1.71736 | 29.5 |
| | $r_6=+\ 38.50$ | $l_3=\ 1.6$ | | |
| $L_4$ | $r_7=+\ 43.90$ | $d_4=25.5$ | 1.65113 | 57.2 |
| $L_5$ | $r_8=-\ 54.50$ | | | |
| | $r_9=\ \infty$ | $d_5=\ 2.0$ | 1.56965 | 49.5 |
| | | $l_4=\ 5.9$ | | |
| $L_6$ | $r_{10}=\ \infty$ | | | |
| | $r_{11}=+\ 39.50$ | $d_6=\ 2.7$ | 1.52682 | 51.1 |
| $L_7$ | $r_{12}=-\ 49.00$ | $d_7=30.7$ | 1.63400 | 51.0 |
| | $r_{13}=-\ 39.90$ | $l_5=\ 2.4$ | | |
| $L_8$ | $r_{14}=+160.00$ | $d_8=\ 4.3$ | 1.65332 | 39.7 |
| $L_9$ | $r_{15}=-\ 60.33$ | $d_9=23.5$ | 1.65160 | 58.5 |
| | $r_{16}=-\ 48.00$ | $l_6=24.0$ | | |
| $L_{10}$ | $r_{17}=-\ 73.70$ | $d_{10}=3.5$ | 1.51680 | 64.2 |
| | $r_{18}=-\ 50.60$ | $l_7=13.2$ | | |
| $L_{11}$ | $r_{19}=-\ 98.20$ | $d_{11}=\ 6.0$ | 1.51680 | 64.2 |
| Distance $r_{19}-$ Image = 33.9 | | | | |

EXAMPLE 10 (FIG. 6)

| | | | $n_d\ \nu_1$ = 17.9 | |
|---|---|---|---|---|
| $L_1$ | $r_1=+\ 160.00$ | $d_1=\ 9.4$ | 1.55232 | 63.5 |
| | $r_2=+\ 35.90$ | | | |
| | | $l_1=17.9$ | | |
| $L_2$ | $r_3=+\ 41.98$ | $d_2=18.0$ | 1.74000 | 28.2 |
| | $r_4=+\ 25.34$ | $l_2=\ 2.0$ | | |
| $L_3$ | $r_5=+\ 28.00$ | $d_3=17.3$ | 1.65160 | 58.5 |
| $L_4$ | $r_6=-\ 30.80$ | $d_4=\ 2.3$ | 1.61160 | 49.8 |
| | $r_7=+5000.00$ | $l_3=\ 3.8$ | | |
| $L_5$ | $r_8=-5000.00$ | $d_5=\ 1.4$ | 1.52250 | 59.5 |
| $L_6$ | $r_9=+\ 28.40$ | $d_6=17.9$ | 1.61340 | 44.3 |
| | $r_{10}=-\ 29.10$ | $l_4=\ 0$ | | |
| $L_7$ | $r_{11}=-\ 29.10$ | $d_7=\ 3.3$ | 1.73627 | 34.7 |
| $L_8$ | $r_{12}=\ \infty$ | $d_8=14.1$ | 1.72000 | 50.4 |
| | $r_{13}=-\ 41.98$ | $l_5=11.8$ | | |
| | $r_{14}=-\ 32.00$ | | | |
| $L_9$ | $r_{15}=-\ 58.30$ | $d_9=\ 1.5$ | 1.55232 | 63.5 |
| | $r_{16}=-\ 31.10$ | $l_6=11.5$ | | |
| $L_{10}$ | $r_{17}=-\ 55.46$ | $d_{10}=4.5$ | 1.55232 | 63.5 |
| Distance $r_{17}-$ Image = 50.6 | | | | |

EXAMPLE 11 (FIG. 7)

| | | | $n_d\ \nu_d$ | |
|---|---|---|---|---|
| $L_1$ | $r_1=+\ 160.00$ | $d_1=\ 9.4$ | 1.55232 | 63.5 |
| | $r_2=+\ 35.90$ | $l_1=17.9$ | | |
| | $r_3=+\ 41.81$ | | | |

| | | | | |
|---|---|---|---|---|
| $L_2$ | $r_4=+\ 25.40$ | $d_2=16.5$ | 1.74000 | 28.2 |
| | $r_5=+\ 29.10$ | $l_2=1.0$ | | |
| $L_3$ | $r_6=-\ 30.80$ | $d_3=18.8$ | 1.65160 | 58.5 |
| $L_4$ | $r_7=\infty$ | $d_4=2.3$ | 1.61160 | 49.8 |
| | $r_8=\infty$ | $l_3=3.8$ | | |
| $L_5$ | $r_9=+\ 28.40$ | $d_5=1.4$ | 1.52249 | 59.5 |
| $L_6$ | $r_{10}=-\ 29.10$ | $d_6=17.9$ | 1.61340 | 44.3 |
| | $r_{11}=-\ 29.10$ | $l_4=0.8$ | | |
| $L_7$ | $r_{12}=\infty$ | $d_7=3.3$ | 1.73627 | 34.7 |
| $L_8$ | $r_{13}=-\ 41.81$ | $d_8=14.1$ | 1.72000 | 50.4 |
| | $l_5=11.8$ | | | |
| | $r_{14}=-\ 32.00$ | | | |
| $L_9$ | $r_{15}=-\ 58.30$ | $d_9=1.5$ | 1.55232 | 63.5 |
| | $l_6=11.5$ | | | |
| | $r_{16}=-\ 31.20$ | | | |
| $L_{10}$ | | | | |
| $d_{10}=4.5$ | | | 1.55232 | 63.5 |
| | $r_{17}=-\ 55.74$ | | | |
| Distance $r_{17}$– Image = 50.8 | | | | |

EXAMPLE 12 (FIG. 7)

| | | | $n_d$ | $v_d$ |
|---|---|---|---|---|
| $L_1$ | $r_1=+\ 144.00$ | $d_1=10.5$ | 1.55232 | 63.5 |
| | $r_2=+\ 35.00$ | $l_1=17.9$ | | |
| $L_2$ | $r_3=+\ 42.81$ | $d_2=15.3$ | 1.75496 | 53.0 |
| | $r_4=+\ 24.75$ | $l_2=1.0$ | | |
| $L_3$ | $r_5=+\ 26.50$ | $d_3=21.2$ | 1.64050 | 60.1 |
| $L_4$ | $r_6=-\ 31.50$ | $d_4=3.8$ | 1.58921 | 39.4 |
| | $r_7=\infty$ | $l_3=1.0$ | | |
| | $r_8=\infty$ | | | |
| $L_5$ | $r_9=+\ 27.20$ | $d_5=3.2$ | 1.51120 | 60.4 |
| $L_6$ | $r_{10}=-\ 24.00$ | $d_6=19.2$ | 1.61340 | 44.3 |
| | $r_{11}=-\ 23.31$ | $l_4=0.5$ | | |
| $L_7$ | $r_{12}=\infty$ | $d_7=3.1$ | 1.76627 | 32.2 |
| $L_8$ | $r_{13}=-\ 40.94$ | $d_8=13.0$ | 1.72000 | 50.4 |
| | $r_{14}=-\ 32.42$ | $l_5=12.0$ | | |
| $L_9$ | $r_{15}=-\ 58.30$ | $d_9=2.0$ | 1.56873 | 63.1 |
| | $r_{16}=-\ 31.60$ | $l_6=12.0$ | | |
| $L_{10}$ | $r_{17}=-\ 55.48$ | $d_{10}=5.5$ | 1.56873 | 63.1 |
| Distance $r_{17}$– Image = 48.0 | | | | |

EXAMPLE 13 (FIG. 8)

| | | | $n_d$ | $v_d$ |
|---|---|---|---|---|
| $L_1$ | $r_1=3+270.00$ | $d_1=10.98$ | 1.51680 | 64.3 |
| | $r_2=+\ 47.82$ | $l_1=32.95$ | | |
| $L_2$ | $r_3=+\ 74.91$ | $d_2=25.20$ | | |
| | $r_4=-\ 82.90$ | | | |
| $L_3$ | $r_5=+101.97$ | $d_3=1.39$ | 1.74000 | 44.8 |
| | $r_6=+\ 91.00$ | $l_2=1.70$ | | |
| $L_4$ | $r_7=-\ 48.50$ | $d_4=28.43$ | 1.65830 | 57.3 |
| $L_5$ | $r_8=\infty$ | $d_5=2.00$ | 1.55781 | 53.9 |
| | $r_9=\infty$ | $l_3=6.04$ | | |
| $L_6$ | $r_{10}=+\ 37.70$ | $d_6=2.00$ | 1.53315 | 58.0 |
| $L_7$ | $r_{11}=-\ 28.50$ | $d_7=30.00$ | 1.64050 | 60.1 |
| $L_8$ | $r_{12}=-102.95$ | $d_8=3.00$ | 1.78443 | 43.9 |
| | $r_{13}=-\ 85.00$ | $l_4=4.00$ | | |
| $L_9$ | $r_{14}=+280.00$ | $d_9=6.00$ | 1.61293 | 37.0 |
| $L_{10}$ | $r_{15}=-\ 73.10$ | $d_{10}=18.00$ | 1.69100 | 54.9 |
| | $r_{16}=-\ 48.00$ | $l_5=25.20$ | | |
| $L_{11}$ | $r_{17}=-\ 73.20$ | $d_{11}=4.20$ | 1.51680 | 64.3 |
| | $r_{18}=-\ 54.00$ | $l_6=12.60$ | | |
| | $r_{19}=-104.81$ | $d_{12}=3.40$ | 1.51680 | 64.3 |
| Distance $r_{19}$– Image = 26.4 | | | | |

EXAMPLE 14 (FIG. 9)

| | | | $n_d$ | $v_d$ |
|---|---|---|---|---|
| $L_1$ | $r_1=+\ 202.73$ | $d_1=3.9$ | 1.58313 | 59.5 |
| | $r_2=+\ 60.40$ | $l_1=38.8$ | | |
| $L_2$ | $r_3=+\ 67.90$ | $d_2=30.1$ | 1.75084 | 27.5 |
| | $r_4=+\ 41.70$ | $l_2=5.8$ | | |
| $L_3$ | $r_5=+\ 58.20$ | $d_3=27.2$ | 1.72875 | 54.2 |
| $L_4$ | $r_6=-\ 58.20$ | $d_4=9.5$ | 1.63000 | 50.7 |
| | $r_7=+1387.00$ | $l_3=5.8$ | | |
| $L_5$ | $r_8=-1387.00$ | $d_5=2.5$ | 1.48750 | 70.4 |
| $L_6$ | $r_9=+\ 55.80$ | $d_6=30.1$ | | |
| $L_7$ | $r_{10}=-\ 28.45$ | $d_7=9.7$ | 1.74000 | 28.2 |
| | $r_{11}=-\ 50.87$ | $l_4=24.3$ | | |
| $L_8$ | $r_{12}=-\ 43.80$ | $d_8=0.8$ | 1.61272 | 58.6 |
| $L_9$ | $r_{13}=-130.00$ | $d_9=7.0$ | 1.61293 | 37.0 |
| | $r_{14}=-\ 70.45$ | $l_5=29.3$ | | |
| $L_{10}$ | $r_{15}=-\ 53.60$ | $d_{10}=6.0$ | 1.60361 | 53.6 |
| | $r_{16}=-\ 93.80$ | | | |
| Distance $r_{16}$– Image = 25.6 | | | | |

What is claimed is:

1. A wide-angle objective composed of six components separated from each other by air spaces and located three at the object side of a diaphragm and three at the image side of such diaphragm, said six lens components taken in consecutive order from the side of the object comprising:

a. a first lens component composed of at least one dispersing meniscus lens member curved towards the object side;

b. a second lens component which follows a larger air space composed of a meniscus lens component curved towards the object side;

c. a third lens component which follows an air space which is greater than 0.005 F and smaller than 0.17 F, said third lens component possessing a collecting refractive index and having a strongly convex curved outer surface facing the object side having a radius of curvature lying in a range between 0.26 and 0.95 F, and further having a concave cemented surface facing the object side which at the side of the object possesses a greater refractive index than at the image side and has a radius of curvature lying in a range between 0.30 and 0.72 F;

d. a fourth lens component which follows the diaphragm space, said fourth lens component having a collecting refractive index and a strongly convex curved outer surface which faces the image and possessing a radius of curvature between 0.24 and 1.05 F and further possesses a concave cemented surface facing the image and which at the side of the image exhibits a greater refractive index than at the side of the object and has a radius of curvature which is in the range between 0.28 and 0.60 F;

e. a fifth lens component which follows an air space which is greater than 0.00 and smaller than 0.25 F, said fifth lens component comprising a meniscus lens component which is curved towards the image and assembled from at least one dispersing and collecting lens;

f. a sixth lens component which follows a larger air space and composed of at least one dispersing meniscus lens member curved towards the image;

g. the spacing of both outer surfaces of said cemented third and fourth collecting lens components which face away from the diaphragm being in a range between 0.35 and 0.90 F;

h. the radius of curvature of said convex surface of said third lens component being in a range amounting to one to three times the axial thickness of said third lens component;

i. the radius of curvature of said convex surface of the fourth lens component being in a range between one to three times the axial thickness of said fourth lens component; and j. the outside radius of the objective at the side of the image being less than the outside radius at the side of the object.

2. A wide-angle objective as defined in claim 1, wherein the difference of the radii of curvature of the boundary surfaces of the air space between said fourth lens component and said fifth lens component is greater than 1.35 times the difference between the radii of curvature of the boundary surfaces of the air space between said second lens component and said third lens component.

3. A wide-angle objective as defined in claim 1, wherein the number of independent dispersing meniscus lens members is greater at the image side by a factor of one than at the object side.

4. A wide-angle objective as defined in claim 1, wherein said first lens component comprises a plurality of dispersing meniscus lens members curved towards the object side.

5. A wide-angle objective as defined in claim 1, wherein said sixth lens component comprises a plurality of dispensing meniscus lens members curved towards the image.

* * * * *